UNITED STATES PATENT OFFICE.

DANIEL DRAWBAUGH, OF EBERLYS MILL, AND BLAKE E. GAMBLE, OF BOWMANSDALE, PENNSYLVANIA.

ARTIFICIAL FUEL.

No. 846,437.     Specification of Letters Patent.     Patented March 5, 1907.

Application filed October 15, 1906. Serial No. 339,036.

*To all whom it may concern:*

Be it known that we, DANIEL DRAWBAUGH, of Eberlys Mill, Cumberland county, Pennsylvania, and BLAKE E. GAMBLE, of Bowmansdale, Cumberland county, Pennsylvania, both citizens of the United States, have invented certain new and useful Improvements in Artificial Fuel and Method of Making the Same, of which the following is a full, clear, and exact description.

This invention relates to a composition of matter for use as fuel and the method of mixing the same to form the fuel, the main object of the invention being to produce an artificial fuel without the aid of heat made of comminuted carbonaceous material—such as coal, peat, and sawdust—combined with a hardening binder and a waterproofing and a weather-resisting material.

To produce this fuel, we combine with fine carbonaceous material hydrated sulfate of lime—such as anhydrous gypsum or plaster-of-paris as a binder, manganese dioxid as an oxidizer, and sufficient water to insure adhesion. These ingredients form an artificial fuel; but to make the same waterproof and a weather resistant we mix with (or spray upon) the mass or completed blocks or briquets a solution of chromatized gelatin.

In the preparation of this artificial fuel the carbonaceous material is mixed with manganese dioxid to which is added and thoroughly mixed a mass of hydrated sulfate of lime and chromatized gelatin having sufficient water to insure adhesion. The mixed ingredients are then pressed into blocks or briquets and allowed to dry.

While the proportions of the ingredients may be varied within wide limits, and it is not desired to limit the invention to particular proportions, practical demonstration has shown that good results may be had by the use of the following formula: comminuted carbonaceous material, about ninety-two per cent.; hydrated sulfate of lime, about seven and three-fourths per cent.; manganese dioxid, about one-fourth per cent., and just enough chromatized gelatin to form a waterproofing and weather-resisting coating.

We claim—

1. The method of making artificial fuel, consisting of comminuting carbonaceous material, adding thereto and mixing therewith manganese dioxid; adding to the above a thoroughly-mixed mass of hydrated sulfate of lime and chromatized gelatin with sufficient water to insure adhesion; then pressing the mixed ingredients into blocks or briquet, and drying the same.

2. The herein-described artificial fuel, consisting of comminuted carbonaceous material about ninety-two per cent., hydrated sulfate of lime about seven and three-fourths per cent., and manganese dioxid about one-fourth per cent. and a waterproofing and weather-resisting agent.

3. The herein-described artificial fuel, consisting of comminuted carbonaceous material about ninety-two per cent., hydrated sulfate of lime about seven and three-fourths per cent., manganese dioxid about one-fourth per cent., and a solution of chromatized gelatin.

DANIEL DRAWBAUGH.
BLAKE E. GAMBLE.

Witnesses:
CHARLES E. BRETZ,
ALEXANDER S. STEWART.